Sept. 19, 1950            A. J. HUCK            2,522,718
VAPORIZER
Filed March 13, 1947                                2 Sheets-Sheet 1
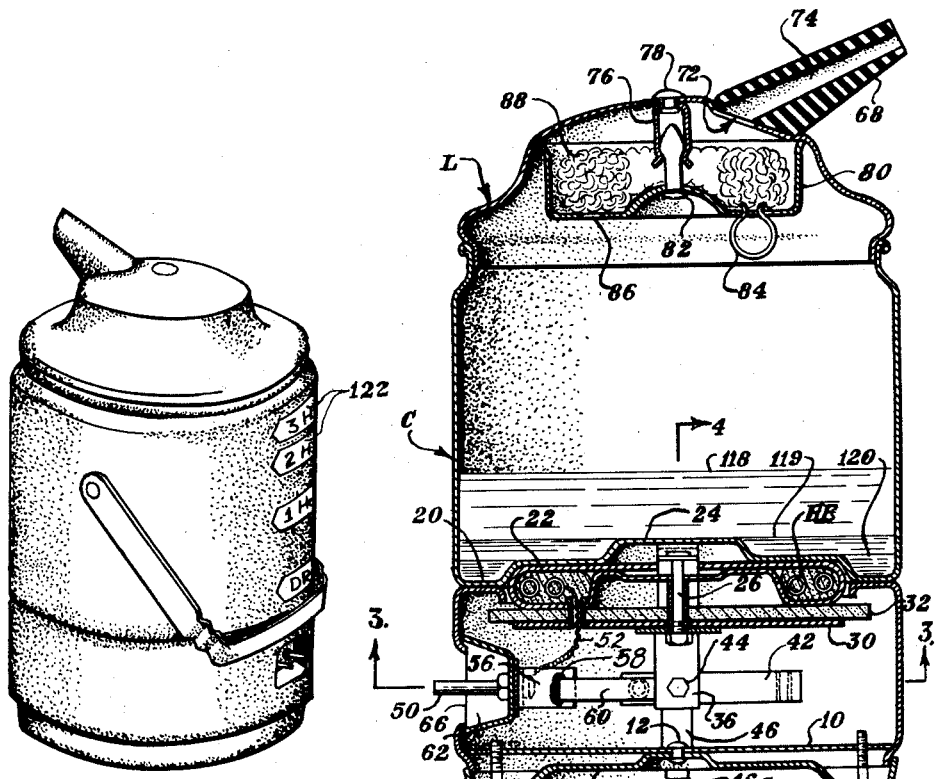
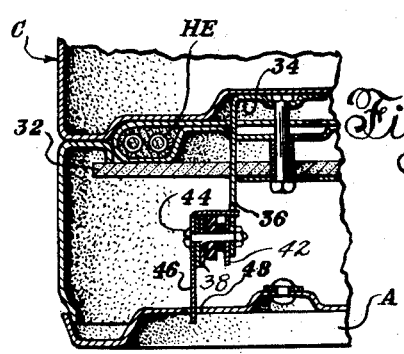
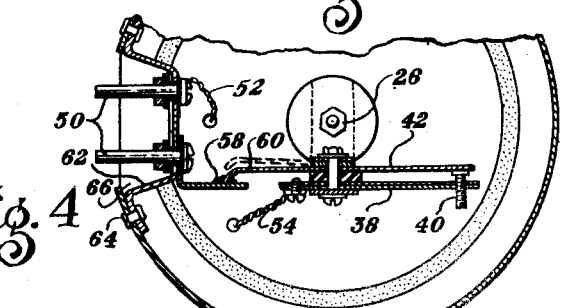
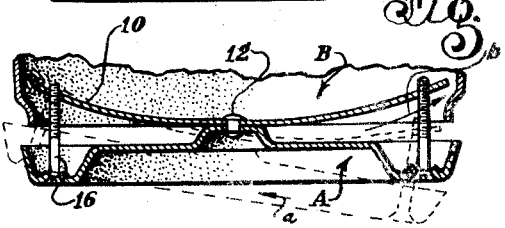
INVENTOR
*Alfred J. Huck*
BY *Bair & Freeman*
ATTORNEYS Sept. 19, 1950     A. J. HUCK     2,522,718
VAPORIZER Filed March 13, 1947     2 Sheets-Sheet 2

INVENTOR
*Alfred J. Huck*

BY *Bair & Freeman*

ATTORNEYS

Patented Sept. 19, 1950

2,522,718

UNITED STATES PATENT OFFICE 2,522,718

VAPORIZER

Alfred J. Huck, St. Louis, Mo., assignor to Knapp-Monarch Company, St. Louis, Mo., a corporation of Delaware Application March 13, 1947, Serial No. 734,394

7 Claims. (Cl. 219—44)

1

This invention relates to an electric vaporizer or other type of electrical water heating appliance having automatic control to open the electric circuit in the event that the water container of the appliance runs dry.

One object of the invention is to provide a water heating appliance wherein the thermostat is immediately responsive to a "runs dry" condition due to the manner of mounting the control thermostat so that it is responsive to a portion of the container from which water has evaporated. Another object is to provide such portion of the container arranged for the water to evaporate therefrom first and then from the portion of the container heated by the heating element, the heat from the heating element then being conducted to the thermostat for effecting operation of the same before the heat from the heating element has a chance to damage the appliance.

Still another object is to provide a portion of the container to still contain a small quantity of water after the thermostat opens the circuit so that any danger of melting the container is eliminated, the thermostat being arranged for either manual resetting or reclosure upon temperature drop. A further object is to provide a fusable connection in the circuit which is capable of being melted for breaking the circuit at a higher temperature than the setting of the thermostat so as to open the circuit in the event the thermosat contacts stick, or the thermostat otherwise fails to operate.

Still a further object is to provide a water heating appliance having a base construction which is relatively low in temperature and therefore requires no mounting feet for spacing it from a table top or the like.

An additional object is to provide a bottom plate for the base which may be readily removed without disconnecting attaching screws or other loose parts that might be lost before reassembly.

Another additional object is to provide a water heating appliance such as a vaporizer for medicant wherein a container for the medicant is mounted by snapping it into the lid of the vaporizer so that it can be removed by snapping it out of the lid.

A further additional object is to provide a discharge for steam and medicant vapor from the appliance in the form of a spout made of insulating material and attached to the lid, the spout being thereby usable as a handle for removing the lid and for striking the lid against a table top or the like for permitting the medicant container to be dislodged from position in the lid.

2

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a perspective view of a water heating appliance of the vaporizer type embodying my present invention.

Fig. 2 is an enlarged vertical sectional view through the vaporizer.

Fig. 3 is a sectional view on the line 3—3 of Fig. 2 showing a thermostat construction.

Fig. 4 is a sectional view on the line 4—4 of Fig. 2 showing further details of the thermostat.

Fig. 9 is a sectional view similar to the bottom portion of Fig. 2 showing how the bottom of the appliance is installed.

Figures 5, 6:
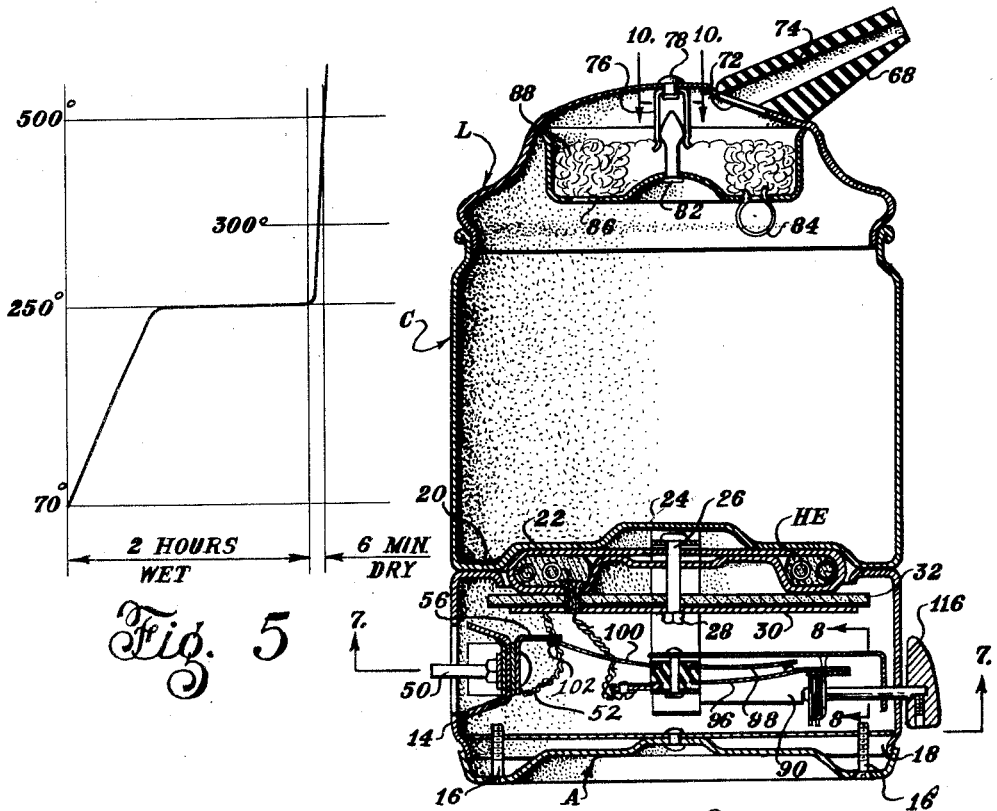
Fig. 5 is a graph showing temperature conditions in the appliance at different periods during the operation thereof.
Fig. 6 is a sectional view similar to Fig. 2 showing a modified construction wherein the thermostat is of the type that can be reset after tripping to "off" position.

In the accompanying drawings I have used the reference character B to indicate a base and C a container. The base and container are made of relatively thin sheet metal such as aluminum, and for the base B a bottom member A is provided. The bottom member A is held in position by a metal strap 10 riveted to the bottom A as at 12, and the strap pulled against a shoulder 14 of the base B by means of a pair of screws 16. The periphery of the bottom A fits around a depending flange 18 of the base B to position the bottom with respect to the base.

The bottom is installed by having the screws 16 loose and shifting the bottom A to the left as indicated by the arrow $a$ whereupon it assumes the dotted position illustrated in Fig. 9, then swinging the right hand end up and then shifting to the right as indicated by the arrow $b$ until the bottom is in the full line position illustrated. The screws 16 may then be tightened as in Fig. 2. With such an arrangement the bottom A may be removed by merely loosening screws 16 instead of removing them and thereby make it impossible for them to be lost before reassembly.

The container C may be secured to the base B by spot welding the base to a depressed bottom portion 20 of the container. The bottom portion 20 of the container is annular and just inside it is a second annular portion 22 of somewhat higher elevation terminating in a still higher center portion 24.

The sheather heating element HE is held against the bottom portion 22 by means of a bolt 26, a nut 28, and a metal disc 30. Interposed between the metal disc 30 and the heating element is a disc 32 of asbestos or other suitable insulating material.

The bolt 26 has its head retained by a bracket having a horizontal portion 34 and a vertical portion 36, this bracket is best shown in Fig. 4. The vertical portion 36 passes through the sheath of the heating element HE and the discs 30 and 32 and serves as a support for a thermostat. The thermostat consists of a bimetal element 38 having an adjustable contact 40 and a bar 42 carrying a fixed contact normally engaged by the contact 40. The elements 38 and 42 are mounted on a bolt 44 with suitable insulation as shown for preventing a short circuit between the two and for preventing a ground to either the bracket portion 36 or a second bracket 46. The second bracket serves as a steadying connection for the bolt 44 and for this purpose has a reduced lower end 46a entering a slot 48 of the bottom A.

The bimetal element 38 and the heating element HE are connected in series with a pair of terminal prongs 50 on which a service cord plug may be plugged, the connections comprising a lead 52 from one terminal prong to the heating element, a lead 54 from the heating element to the bimetal element, and a bracket 56 connected with the other terminal prong and soldered as at 58 to an extension 60 of the spring bar 42. The extension 60 is preferably of stainless steel and the solder 58 melts at a temperature somewhat above the boiling point, for instance 350°. The element 60 is soldered to the bracket 56 while in a sprung condition, its natural shape being shown by dotted lines in Fig. 3.

The prongs 50 are supported by a bracket 62 secured to the base B as by rivets 64 adjacent an opening 66 in the base adapted to receive the service cord plug. The adjustable contact 40 of the thermostat is set to open at approximately 300°.

A lid L is provided for the container C and a discharge spout 68 is mounted thereon. The discharge spout 68 is preferably formed of heat insulating material such as Bakelite or the like, so as to serve as a handle to lift the lid when the lid is hot. The lid has an opening 72 connecting with a discharge passageway 74 in the nozzle 68.

A spring bracket 76 having three spring fingers is riveted to the center of the lid as at 78. A medicant container 80 of cup shape is mounted in the fingers of the bracket 76 by means of a bulb-like stud 82 secured to the center of the medicant container. A ring 84 is connected to the medicant cup 80 for the purpose of removing it from the lid L if desired. The cup has openings 86 in its bottom to permit passage of steam from the container C to the nozzle of the cup and then out through the discharge passageway 74. The cup is adapted to contain medicant of liquid or salve type applied to wads of cotton 88 or similar material.

Figure 7:
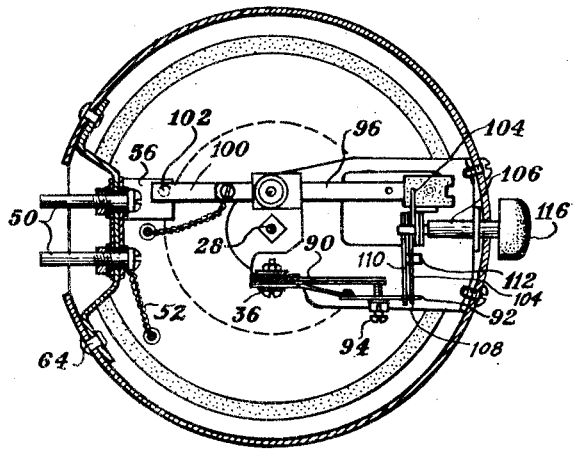
Fig. 7 is a sectional view of the line 7—7 of Fig. 6 showing a bottom plan view of the thermostat.
Figure 8:
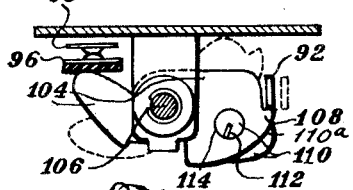
Fig. 8 is an enlarged sectional view on the line 8—8 of Fig. 6 showing the tripping and resetting mechanism for the thermostat of Figs. 6 and 7.
Figure 10:
Fig. 10 is an enlarged sectional view on the line 10—10 of Fig. 6.

In Figs. 6, 7 and 8 I show a modified construction wherein the bracket 36 supports a different type of thermostat. In this case the bimetal element is shown at 90. It is adapted to move a latch blade 92, the blade being adjustable relative to the bimetal element by means of a screw 94. The switch in this form of invention comprises leaf springs 96 and 98 which are normally disengaged, the spring 98 having an extension 100 soldered as at 102 to the bracket 56.

The switch blade 96 is held in raised position by a finger 104 pivoted on a shaft 106. The finger 104 has an integral latch lug 108 adapted to be latched with the finger in the raised position shown in solid lines in Fig. 8 by the latch 92. For effecting the latched position a shaft 106 has secured thereto a plate-like arm 110 provided with a finger 112 in an enlarged opening 114 of the finger 104. When the shaft 106 is rotated clockwise in Fig. 8 it moves the finger 104 from the dotted position to the full line position, and the latch 92 then snaps from its dotted position to its full line position to engage the latch lug 108. The latch lug can be disconnected however, by means of a cam surface 110a on the plate 110 by rotating the shaft 106 counterclockwise in Fig. 8. For rotating the shaft a knob 116 is provided, which knob is mounted on the outside of the base B and shown in Figs. 6 and 7.

*Practical operation*

In the operation of my vaporizer appliance, considering first Figs. 1 to 5 inclusive, the thermostat is normally in the closed position of Fig. 3 and when water is placed in the container C to the various levels indicated by hours in Fig. 1 at 122 and the service cord plugged on to the prongs 50, the heating element HE will heat up and eventually boil the water. The water level for instance may be as shown at 118 in Fig. 2 and this amount of water would last approximately three-quarters of an hour. At the end of that time the water level would have receded to the level as indicated at 119. Recession of the water is caused by steam being generated and the steam passing through the openings 86 and vaporizing the medicant in the cotton 88. The steam and vapor is then discharged through the spout 68 which may be located to discharge in any desired position, preferably of course, toward the heat of a patient receiving medication.

When the water level 119 is reached the central portion 24 of the bottom of the container C is exposed, and all water evaporated therefrom. Accordingly this portion is ready to be heated to thermostat operating temperature as soon as the water recedes further as to the level 120. At this level the water is evaporated from the bottom portion 22 and since this is over the heating element HE its temperature will rise and so will the temperature of the bottom portion 24. As shown in Fig. 5 for instance, it may take 45 minutes for the temperature of the appliance to rise from room temperature to approximately 250° within the base B where the thermostat element 38 or 90 is mounted. Within a period of six minutes after the water reaches the level 120 the temperature of the appliance may rise to 500°. It is desirable to cut off the supply of current before this time however, for instance at 300°. The thermostat contact 40 is therefore set to open at 300°, and the thermostat assumes this temperature immediately after the bottom portion 24 assumes a temperature of 300°. This is due to the conduction of heat from the bottom portion 24 through the bracket 34—36 to the thermostat. There is some slight lag, of course, but this can be taken care of by adjusting the thermostat to a slightly lower setting than the maximum determined for the bottom portion 24 of the container. Thus, by having the thermostat immediately sense the temperature of a portion of the container that becomes heated after evaporation of water therefrom the current is cut off before a dangerously high temperature is reached. At the same time there is still water below the level 120 so as to keep the outer wall of the container C and the base B at a temperature no higher than 212°, thus preventing any temperature like 300° being conducted to the base B and the bottom A where it would burn a table top.

With the thermostat of Fig. 3 when the appliance cools down somewhat the thermostat will come back on but will again prevent overheating because of cutting out the current whenever the temperature goes above 300°. In the event that the contacts stick, or for some other reason the thermostat does not operate then the soldered connection at 58 would melt at a higher temperature than the setting of the thermostat and at a lower temperature than is considered dangerous. This would permanently cut out the circuit until such time as the connection at 58 is resoldered with the proper solder.

With the type of thermostat shown in Fig. 7 when the bimetal element 90 responds to a temperature of 300° it moves the latch 92 to the dotted position of Fig. 8, thereby releasing the latch lug 108 and permitting the spring 96 to swing down from the position in Fig. 6 for opening the circuit at the contacts between the blades 96 and 98. The circuit in this type of appliance would remain open until such time as it is closed by manipulating the knob 116.

The discharge spout 68 being formed of insulating material makes a convenient handle for removing the lid L when refilling the container C and/or removing and replacing the medicant container 80. The medicant container can be removed by grasping the ring 84 or by merely striking the lid against a table top or the like whereupon momentum will cause the medicant container to fall out of position and fall on to the table top.

While I have described a vaporizer appliance in particular, the thermostat arrangement, the stepped bottom arrangement for the container C, the fused connection at 58 or 102, and the base B and bottom plate A arrangement can be used in other types of water heating appliances. The spout 68 and medicant container 80, and the way it is mounted however, are specifically designed for a vaporizer.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a water heating appliance, a container having a bottom wall, an annular heating element for said bottom wall surrounding the central portion thereof, said central portion being elevated with respect to the portion of said bottom wall heated by said heating element, a thermostat, means for conducting heat directly from said central portion of said bottom wall to said thermostat, said thermostat being in circuit with said heating element to open the circuit upon evaporation of water from said elevated central portion of said bottom wall whereupon said conduction means quickly conducts the increased heat of said central portion of said bottom wall to said thermostat.

2. In a water heating appliance, a container having a bottom wall, a heating element for one portion of said bottom wall, a thermostat, metallic means for conducting heat from another portion of said bottom wall to said thermostat, said thermostat being in circuit with said heating element and said another portion of said bottom wall being elevated in relation to said one portion.

3. A water heating appliance comprising a container having a bottom wall provided with an elevated portion, a heating element in contact with said bottom wall and out of contact with said elevated portion, a thermostat, means for conducting heat from said elevated portion to said thermostat, said thermostat being in circuit with said heating element to open the circuit thereto upon evaporation of water from said elevated portion of said bottom wall, said thermostat being retained in open position after being moved to such position, and means to manually latch it in closed position.

4. In a water heating appliance, a container having a bottom wall, a heating element for said bottom wall, said bottom wall being stepped and having one portion higher than the portion with which said heating element engages and another portion lower than the portion with which the heating element engages, a thermostat, means for conducting heat from said higher bottom portion of said bottom wall to said thermostat, said thermostat being in circuit with said heating element to open the circuit upon evaporation of water from said higher bottom portion due to conduction of the increased heat thereof to said thermostat.

5. In a water heating appliance, a container having a bottom wall, a heating element for said bottom wall, said bottom wall being stepped and having one portion higher than the portion with which said heating element engages and another portion lower than the portion with which the heating element engages, said portions being annularly arranged with the higher portion at the center and the lower portion at the outside.

6. In a water heating appliance, a container having a bottom wall, a heating element for said bottom wall, said bottom wall being stepped and having a portion higher than the portion with which said heating element engages, a thermostat, means for conducting heat from said higher portion of said bottom wall to said thermostat, said thermostat being in circuit with said heating element to open the circuit upon evaporation of water from said higher portion of said bottom wall upon conduction of the increased heat of said portion to said thermostat as a result of evaporation of water from said higher portion.

7. In a water heating appliance, a container having a bottom wall, a heating element for said bottom wall, said bottom wall being stepped and having a portion higher than the portion with which said heating element engages, said higher portion being surrounded by said portion with which said heating element engages, a thermostat, means for conducting heat from said higher portion of said bottom wall to said thermostat, said thermostat being in circuit with said heating element to open the circuit upon evaporation of water from said higher portion of said bottom wall upon conduction of the increased heat of said portion to said thermostat as a result of evaporation of water from said higher portion.

ALFRED J. HUCK.

REFERENCES CITED

The following references are of record in the file of this patent:

UNITED STATES PATENTS

| Number | Name | Date |
| --- | --- | --- |
| 888,381 | Andrews | May 19, 1908 |
| 1,055,882 | Cubitt | Mar. 11, 1913 |
| 1,096,916 | Hoffman | May 19, 1914 |
| 1,261,878 | West | Apr. 9, 1918 |
| 1,508,035 | Underwood | Sept. 9, 1924 |
| 2,020,364 | Lehmann | Nov. 12, 1935 |
| 2,211,728 | MacFadden | Aug. 13, 1940 |
| 2,230,898 | MacFadden | Feb. 4, 1941 |
| 2,356,934 | Ketcham | Aug. 29, 1944 |